W. E. GIBBS.
SAW JOINTER.
APPLICATION FILED MAR. 16, 1911.
1,091,329.
Patented Mar. 24, 1914.
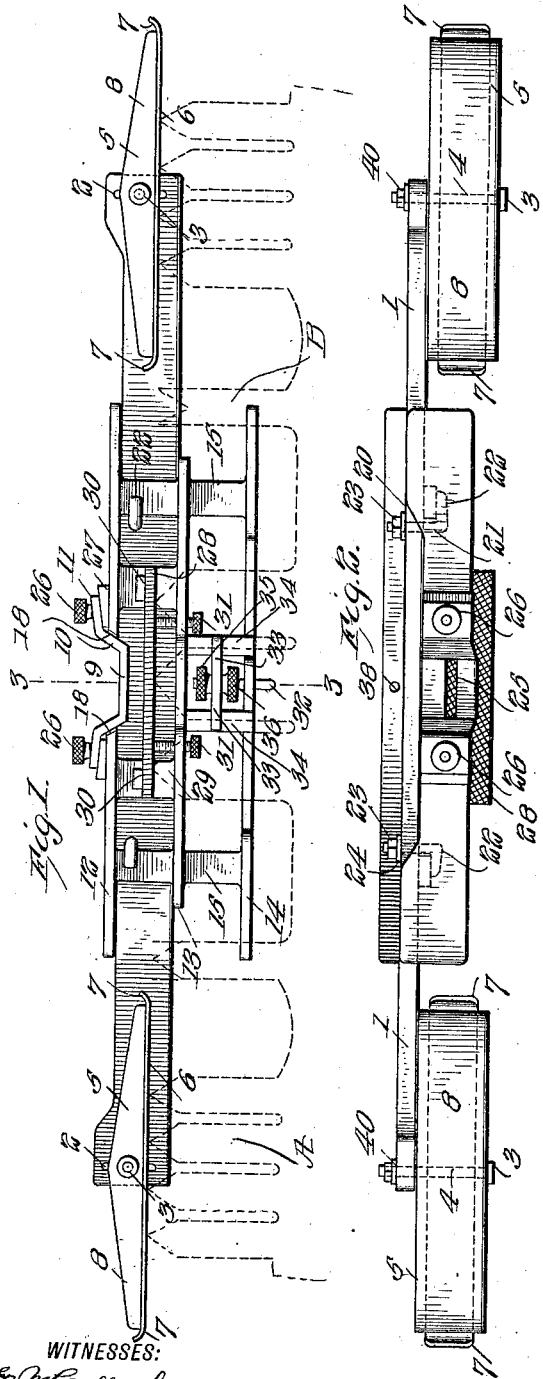
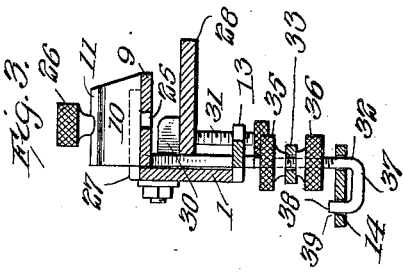
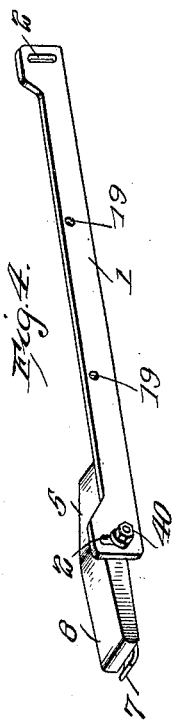
WITNESSES:
E. M. Callaghan
C. E. Trainor
INVENTOR
WILLIAM E. GIBBS
BY Munn & Co.
ATTORNEYS

UNITED STATES PATENT OFFICE.

WILLIAM E. GIBBS, OF OAK POINT, WASHINGTON.

SAW-JOINTER.

1,091,329.      Specification of Letters Patent.      Patented Mar. 24, 1914.

Application filed March 16, 1911. Serial No. 614,836.

*To all whom it may concern:*

Be it known that I, WILLIAM E. GIBBS, a citizen of the United States, and a resident of Oak Point, in the county of Cowlitz, State of Washington, have invented a new and useful Improvement in Saw-Jointers, of which the following is a specification.

My invention is an improvement in saw jointers, and consists in certain novel constructions and combinations of parts hereinafter described and claimed.

Referring to the drawings forming a part hereof: Figure 1 is a side view of the improvement; Fig. 2 is a plan view; Fig. 3 is a section on the line 3—3 of Fig. 1; and Fig. 4 is a perspective view of the frame bar and one runner.

In the embodiment shown in the drawings a frame bar 1 is provided, having at each end a transverse bearing slot 2, in which is journaled a bolt 3 which passes through a central opening 4 in a runner or guide plate 5. Each of the said plates has one edge plane and straight, and a smooth faced hardened steel plate 6 is formed or secured on the said straight edge.

The ends of the plate are upturned, as shown at 7, and the opposite edge 8 of the runner is beveled from the center toward both ends. A gage plate is adjustably held at the center of the frame bar and at one side thereof. The said plate is approximately U-shaped, as shown, and the extremities 11 of the arms 10 of the plate are bent laterally outward at a slight angle to the body portion 9 of the plate.

A bracket comprising three parallel plates 12, 13 and 14, connected by cross bars 15, is held on the frame bar at the longitudinal center thereof, and one of the plates, 12, is cut away at its center to receive the body 9 of the gage plate. The plate 12 fits against the upper edge of the frame bar, and the center plate 13, which is of lesser length than the outer plates 12 and 14, fits against the lower edge of the said bar.

It will be noted from an inspection of Fig. 1, that the edge of the plate 14 adjacent to the saw is cut away at the central portion of the said plate. At the ends of the said plate, the edge adjacent to the saw is flush with the corresponding edge of the plate 13.

The bracket is held in place on the frame bar by means of stems 21, the frame bar 1 being perforated as shown at 19 to receive the said stems. Each of the stems 21 is provided with an angular head 22 at one end, engaging the adjacent cross bar 15 of the bracket, and the opposite end of the stem is threaded and is engaged by a nut 23, to hold the bracket in place. By loosening the nuts, and turning the stems, to disengage the angular portions from the cross bar the bracket may be removed from the frame bar. A washer 24 is arranged between each nut and the frame bar. That edge of the bar 12 of the bracket which extends above the upper edge of the frame bar 1 is cut away intermediate the ends of the bar as shown in Fig. 2, the depth of the cut being equal to the thickness of the frame bar, and the ends of the cut are beveled as shown at 18 in Fig. 1.

The gage plate is provided with a longitudinal slot 25 in its body 9 and is held in place by means of set-screws 26. Each screw is passed through an extremity 11 and through a longitudinally slotted wedge 27 into the plate 12 of the bracket. By loosening the set-screws the wedges may be moved to move the gage plate toward or from the frame bar.

The file 28 is held on a pair of cross bars 29 which connect the plates 12 and 13 of the bracket. Each cross bar is provided with a lug 30 against which the file rests, parallel with the body 9 of the gage plate, and with its flat side in position for engagement by the tooth of the saw, as indicated in Fig. 1. A set-screw 31 is threaded through the plate 13 near each lug 30, and bears against the opposite or lower face of the file to hold it firmly against the lugs.

A gage pin 32 is arranged between the set-screws 31. The said pin extends through the plate 14 and through an opening in a short plate 33, which connects two cross bars 34, between the plates 13 and 14. The said cross bars connect the plate at approximately their centers, and the cross plate 33 connects the cross bars.

The pin 32 (Fig. 3) is threaded at one end and is engaged by thumb nuts 35 and 36 one on each side of the cross plate. The lower end of the pin is bent laterally at 37 and then parallel with the main portion at 38, and the said portion 38 passes through an opening 39 in the plate 14. It will be evident that the pin may be adjusted laterally by means of the thumb nut and may be locked in position when adjusted.

The runners may be adjusted on the frame bar by loosening the nuts 40 on the bolts 3 and moving the said bolts in the slots 2. When in the proper position the runner may be held fixed on the bar by tightening the nut on the bolt. The tool may be thus arranged for saws of different curvature.

In the use of the tool as a jointer, the file is arranged as shown in Figs. 1, 2 and 3, and the runners are adjusted to the proper position, so that when the file is held just clear the teeth will be of proper length. The tool is then moved over the teeth, with the runners moving on their points. It will be evident that the high teeth will be cut down until the file does not cut them any longer. The saw will thus be brought to a true curve; when the file is not to be used it may be detached and laid away by loosening the thumb screws 31 until it can be removed from the lugs. When the tool is used in filing saws, the gage plate holds the tool with the file in the exact position that the tooth should be cut.

The tooth is passed through the slot 25 with the outer face of one of the portions 10 of the gage plate in contact with the edge of the tooth. The gage pin is used in the usual manner and may be adjusted to the desired position by the thumb nuts 35 and 36. It will be evident that the angle of the surfaces of the portions 10 of the gage plate may be varied by means of the wedges.

When one wedge is moved inward the adjacent portion 10 of the plate is inclined at a greater angle to the file, and by moving both wedges a great amount of variation is permitted, sufficient for all ordinary purposes.

The pin is made use of to gage the length of the raker teeth and the said pin may be adjusted by means of the thumb nuts 35—36, and when in adjusted position, may be locked by the same nuts. The adjustment is very speedy, thus saving a large amount of time to the operator. In Fig. 1 the device is shown in operative position. The plates 13—14 bear against the sides of the teeth A and the sides of the raker teeth B, the said plates acting as guides. The runners 5 hold the file 28 at right-angles to the teeth. The device may be made to fit any curvature of saw by adjusting the said runners on the frame bar. The pin is used as follows:—The bracket is removed from the frame bar by turning the stems 21 to disengage the angular heads 22 from the cross bars 15, and the file is removed from the bracket. After the pin has been adjusted the bracket is reversed from the position of Fig. 1, and the plate 14 rests upon the points of the cutting teeth. The said plate is moved along the points, and the raker teeth that engage the portion 38 of the pin require swaging, while those which merely touch or over which the pin slides, do not require swaging. When the raker teeth require swaging, the device is returned to its original position, and so arranged that the raker teeth to be swaged, extend through the slot 25 of the plate 9. The plate 9 is so adjusted, that only the raker teeth requiring to be swaged extend through the slot, and when placed as above specified, the said raker teeth may be swaged by striking that portion extending through the slot, until it is flush with the upper face of the plate 9.

I claim:

1. In a device of the character specified, a frame bar provided at each end with a transverse slot, a runner having a straight edge for engaging the teeth and provided with a central opening, a bolt passing through the opening and slot to adjustably hold the runner to the bar.

2. In a device of the character specified, a frame bar, a runner at each end of the bar, each runner having a straight hardened edge, means for securing the runners parallel with the bar and means in connection with the said means for adjusting the runners laterally of the bar.

3. In a device of the character specified, a bracket comprising a pair of spaced parallel plates, one of the plates having a cut away portion at its center, a gage plate having a longitudinal slot and having an arm at each end inclined with respect to the plate supported on the cut away portion, the outer end of each of the said arms being bent laterally, a wedge movable under each of the said outer ends, and means for clamping each of the said ends and the adjacent wedge to the plate.

4. In a device of the character specified, a bracket, a gaging pin carried by the bracket, said bracket comprising spaced substantially parallel plates provided with openings for receiving the pin, a nut threaded on the pin on each side of one of the plates, and means for preventing rotation of the pin with respect to the plates.

5. In a device of the character specified, a bracket, comprising a plurality of spaced plates, a gaging pin carried by the bracket, the plates of the brackets being provided with openings for receiving the pin, and a nut on the pin on each side of one of the plates.

WILLIAM E. GIBBS.

Witnesses:
 F. L. LENT,
 F. M. CHANCE.

---

Copies of this patent may be obtained for five cents each, by addressing the "Commissioner of Patents, Washington, D. C."